United States Patent
Scheler

(10) Patent No.: US 11,318,894 B2
(45) Date of Patent: May 3, 2022

(54) VEHICLE RETROFIT PROVIDING EXTENDED INTERIOR WIDTH

(71) Applicant: FLARE SPACE, LLC, Evergreen, CO (US)

(72) Inventor: Sonja Scheler, Evergreen, CO (US)

(73) Assignee: FLARESPACE AL, LLC, Birmingham, AL (US)

( * ) Notice: Subject to any disclaimer, the term of this patent is extended or adjusted under 35 U.S.C. 154(b) by 273 days.

(21) Appl. No.: 16/830,014

(22) Filed: Mar. 25, 2020

(65) Prior Publication Data

US 2021/0053507 A1    Feb. 25, 2021

Related U.S. Application Data

(60) Provisional application No. 62/823,250, filed on Mar. 25, 2019.

(51) Int. Cl.
*B60R 13/02* (2006.01)
*B62D 25/02* (2006.01)

(52) U.S. Cl.
CPC .......... *B60R 13/0237* (2013.01); *B62D 25/02* (2013.01); *B60R 2013/0293* (2013.01)

(58) Field of Classification Search
CPC ........ B60R 13/0237; B60R 2013/0293; B60R 13/04; B62D 25/02
USPC ...................................................... 296/37.13
See application file for complete search history.

(56) References Cited

U.S. PATENT DOCUMENTS

| | | | |
|---|---|---|---|
| 2,231,932 A | 2/1941 | Lyon |
| 2,645,518 A | 7/1953 | Cook |
| 2,661,233 A | 12/1953 | Sidel |
| 2,782,068 A | 2/1957 | Esche |
| 3,501,194 A | 3/1970 | Frank |
| 3,730,580 A | 5/1973 | Page, Jr. |
| 4,231,609 A | 11/1980 | Sorensen |
| 4,295,678 A | 10/1981 | Morris |
| 4,550,946 A | 11/1985 | Hanemaayer |
| 4,775,179 A | 10/1988 | Riggs |
| 4,913,485 A | 4/1990 | Moffatt et al. |
| 4,930,837 A | 6/1990 | Marsh et al. |
| 5,011,216 A | 4/1991 | Baughman |
| 6,213,531 B1 | 4/2001 | Corey et al. |
| 6,557,230 B1 | 5/2003 | Gernstein |
| 6,682,129 B2 | 1/2004 | Baggett et al. |
| 6,883,860 B1 | 4/2005 | Budge |
| 6,935,680 B2 | 8/2005 | Scott et al. |
| 7,232,179 B1 | 6/2007 | Racz et al. |
| 7,263,754 B1 | 9/2007 | Henry |
| 8,083,286 B2 | 12/2011 | Buda et al. |
| 8,205,399 B2 | 6/2012 | Ralston |

(Continued)

FOREIGN PATENT DOCUMENTS

CA    1099311 A    4/1981

*Primary Examiner* — Pinel E Romain
(74) *Attorney, Agent, or Firm* — Burr & Forman LLP; Jeffrey H. Kamenetsky

(57) ABSTRACT

An accessory body panel includes a recessed feature. The body panel is mounted at the exterior surface of the vehicle body over an opening or hole formed in the vehicle body. The opening can correspond to an OEM window cut-out. The mounted body panel creates an indentation present at the interior side of the vehicle body, which effectively extends the available interior space in the lateral or transverse direction.

20 Claims, 5 Drawing Sheets

(56) References Cited

U.S. PATENT DOCUMENTS

| | | | |
|---|---|---|---|
| 9,205,722 B2 | 12/2015 | Sitko | |
| 10,112,553 B2 * | 10/2018 | Aizawa | B60R 13/0206 |
| 10,640,056 B2 | 5/2020 | Marschall et al. | |
| 2007/0079490 A1 | 4/2007 | DiMario et al. | |
| 2012/0048457 A1 | 3/2012 | Gomes et al. | |
| 2017/0324189 A1 | 11/2017 | Baughman et al. | |
| 2019/0185084 A1 | 6/2019 | Moler | |

* cited by examiner

VEHICLE RETROFIT PROVIDING EXTENDED INTERIOR WIDTH

CROSS-REFERENCE TO RELATED APPLICATIONS

This application claims the benefit of U.S. Provisional patent application Ser. No. 62,823,250, filed on Mar. 25, 2019, which is incorporated herein in its entirety.

FIELD OF THE INVENTION

The present invention relates generally to interior layouts and designs of vehicles, and more particularly, to an article of manufacture and method of installing such an article that facilitate an increase in the interior width of vehicles, such as at the rear quarter panel area of vans.

BACKGROUND OF THE INVENTION

Consumer vehicles are typically offered for sale in a base model reflecting a bottom level trim. This feature of auto industry sales applies across a range of passenger vehicles, such as sedans, coupes, minivans and many versions of trucks targeted for consumers. Prior to purchase, the customer can request enhancements to the base model according to various trim packages each having various features and selections. These vehicle options include, for example, color, interior upholstery, and subsets of packages such as audio systems and premium wheels. However, these trim packages represent the limit of the available options, an unyielding restriction on the features and upgrades that a customer can request from the car manufacturer. If a consumer desires a particular feature not offered by the manufacturer, there is little recourse, other than to commission a special modification from a third-party specialist in the aftermarket, an expensive option, or to choose a different vehicle or maker, which likely entails the same limitations. The consumer is especially handicapped by the limited options if a vehicle is desired that is specially adapted for a particular purpose, such as retrofits to facilitate off-roading (e.g., modified suspension to increase clearance). One notable but difficult adaptation would be the repurposing of the vehicle interior space into suitable living accommodations, such as the project to make conversion vans by outfitting full-sized passenger or cargo vans. Nevertheless, this course of modification is very expensive. In the consumer market, robust vehicle customization is largely absent.

The commercial vehicle market represents a different outlet. Here, many manufacturers offer generic vehicle platforms that are intended to be customized for a particular purpose. For example, the vehicles are often marketed as work trucks for contractors and tradesmen, who may need highly specialized storage facilities for equipment and materials. These custom features may be vital to individual companies for unique purposes in service of a particular application, but have little to no value as an option for consumers in the general population.

Still, generic vehicles do offer advantages over the assembly line vehicles made in the mass production auto industry. Generic vehicles often take one of a few standard forms such as a windowless panel van or a truck platform without a typical cargo bed. Manufacturers offer a small number of options such as engine size, power, two-wheel or all-wheel drive, and a few maximum payload ratings. These generic vehicles are further customized to suit the specific requirements of the purchaser, such as the addition of windows, storage, and cargo boxes, which can be further configured with or without environmental control such as cooling or freezing.

Although generic vehicles can be customized to a purchaser's specifications and make enhancements available to the core vehicle design, a benefit that compares favorably to the lesser options offered by traditional trim packages, the customizations nevertheless fall into a small number of categories. Accordingly, there is an established need for structures, tools and methods to assist service providers in performing common modifications that may be of substantial value in the vehicle customization market.

SUMMARY OF THE INVENTION

The present invention is directed to a vehicle accessory that retrofits the vehicle with a modification to extend the available interior space in the cross-wise or transverse dimension within the vehicle. An opening is formed in the vehicle body, such as the rear quarter panel of a van. An accessory body panel having a recessed feature is mounted over the opening at the vehicle exterior, creating an interior-side indentation. Multiple indentations can be formed with a corresponding number of suitably sized accessory body panels paired with designated openings in the vehicle body. In one implementation, a pair of opposing indentations formed at the driver and passenger sides make it possible to fit a bed lengthwise in the transverse or lateral dimension of the vehicle, an option usually not possible in conventional, unmodified vans. A trim ring may be mounted in the indentation from the interior side of the vehicle, so that the trim ring is situated within and seated against the mounted accessory body panel. The combination of accessory body panel and matching trim ring forms a single package or unit.

Introducing a first embodiment of the invention, the present invention consists of an article for use with a vehicle having a body, comprising:

a vehicle body panel including:
a wall member having a raised rim, and
a peripheral flange extending outwardly from the rim.

In a second aspect of this embodiment, the vehicle body panel includes a tapered section. In one form, the vehicle body panel includes a front end and a rear end, wherein the panel tapers from the rear end to the front end to define the tapered section.

In another aspect, the vehicle body panel incorporates a design specification indicating dimensional fitness relative to an original equipment manufacturer reference line of the vehicle.

In yet another aspect, the vehicle body panel defines a coverage footprint compatible with spanning a targeted opening in the vehicle body. In one form, the targeted opening in the vehicle body conforms to an original equipment manufacturer reference line indicating a window cut out.

In yet another aspect, the vehicle body panel is deployable at an exterior of the vehicle in a mounting relationship over an opening formed in the vehicle body. In one form, the article further includes a trim ring deployable at an interior of the vehicle in a seating relationship within a recess formed by the mounted panel. The trim ring, in one implementation, includes a support member having a proximal edge and a distal edge; and, a peripheral flange extending outwardly from the proximal edge of the support member. During deployment of the vehicle body panel and the trim ring, the support member of the trim ring lies inside the raised rim of the vehicle body panel, and the flange of the trim ring faces an interior surface of the vehicle body.

In yet still another aspect, the flange extends peripherally about the wall member.

Introducing another embodiment of the invention, the present invention consists of a combination for use with a vehicle having a body, comprising:

a vehicle body panel and a trim ring;

a deployment configuration featuring the mounting of the vehicle body panel to the vehicle body at an exterior location thereof and the mounting of the trim ring to the vehicle body at an interior location thereof in facing opposition to the mounted panel;

the vehicle body panel including:

a wall member having a raised rim, a fore section, and an aft section, and a flange projecting outwardly from the rim and extending peripherally along the rim, wherein the vehicle body panel in the deployment configuration is disposed in a mounting relationship over an opening formed in the vehicle body; and the trim ring including:

a support member having a proximal edge and a distal edge, and a peripheral flange extending outwardly from the proximal edge of the support member, wherein in the deployment configuration the support member of the trim ring lies inside the raised rim of the vehicle body panel and the flange of the trim ring faces an interior surface of the vehicle body.

In a second aspect of this embodiment, the vehicle body panel further includes a tapering profile from the aft section to the fore section.

In another aspect, the vehicle body panel features a dimensional profile conforming to an original equipment manufacturer specification. In one form, the original equipment manufacturer specification incorporates reference dimensions of a window cut out.

In yet another aspect, the combination further includes a window integral with the wall member of the vehicle body panel.

Introducing another embodiment of the invention, the present invention consists of a method for use with a vehicle having a body, comprising the steps of:

providing a vehicle body panel having a recessed feature;

forming an opening in the vehicle body; and mounting the vehicle body panel to the vehicle body over the opening thereof.

In another aspect of this embodiment, the providing step further includes the steps of:

providing a mold;

producing a panel workpiece using the mold;

providing a quality control fixture programmed to incorporate original equipment manufacturer specifications indicative of reference dimensions concerning the vehicle;

loading the panel workpiece into the quality control fixture; and processing the panel workpiece by operation of the quality control fixture to conform the processed panel workpiece to the original equipment manufacturer specifications and thereby produce the vehicle body panel.

In still another aspect, the reference dimensions specify a window cut out.

In still another aspect, the forming step further includes the steps of removing a portion of the vehicle body identifiable by the reference dimensions concerning the vehicle.

In yet still another aspect, the forming step further includes the steps of:

identifying at least one original equipment manufacturer reference feature concerning the vehicle body; and machining the vehicle body to produce the opening in compliance with the at least one original equipment manufacturer reference feature.

These and other objects; features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
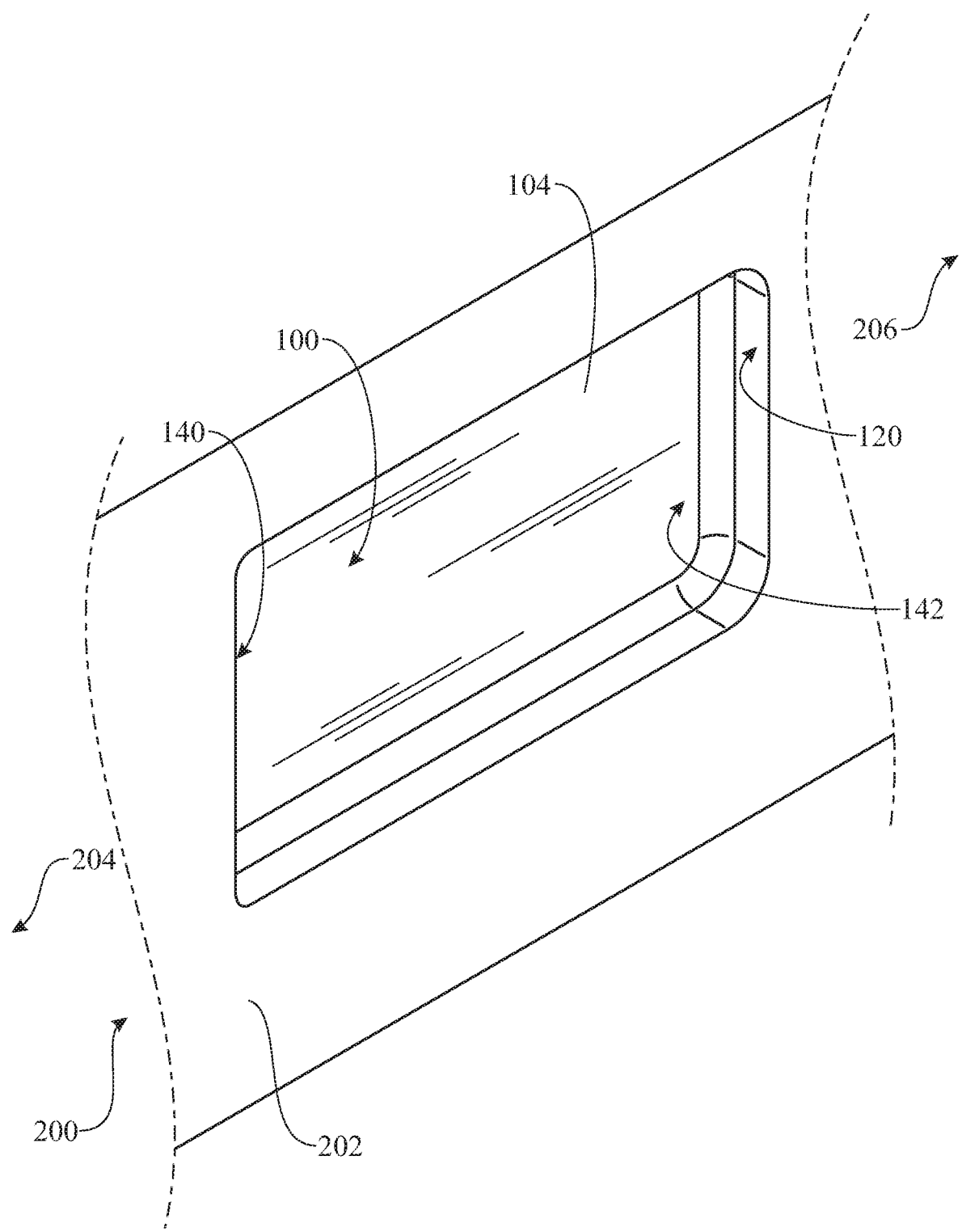
FIG. 1 presents a perspective interior-side view showing a first embodiment of the vehicle accessory panel of the present invention, illustrating the installation of the panel in the body of a vehicle depicted in sectional view.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward the retrofit of a vehicle to expand the available interior space in the cross-wise or transverse dimension. An opening is formed in the vehicle body, such as the rear quarter panel of a van. An accessory body panel having a recessed feature is mounted over the opening at the vehicle exterior, creating an indentation present at the interior side of the vehicle body. This indentation extends the width or lateral dimension of the vehicle interior. A trim ring may be mounted in the indentation from the interior side of the vehicle, so that the trim ring is situated within and seated against the mounted accessory body panel. The combination of accessory body panel and matching trim ring forms a single package or unit. This modification can occur in various suitable places, such as the body panel area designated or reserved for a window. In this case, the opening is formed according to the stamped OEM reference lines indicating the window cut-out.

Referring initially to FIGS. 3 through 6, a vehicle accessory includes, in combination, an exterior-mounted body panel 100 (FIGS. 5-6) and an interior-mounted trim ring 400 (FIGS. 3-4), according to various aspects of the present invention. As discussed further, the panel 100 is mounted over an opening or fabricated cutout formed in the body of a vehicle, such as the rear quarter panel of a van, and forms an exterior cover over the opening. The panel 100 functionally replaces the original body panel excised from the vehicle. The panel 100 has a recess or depth-wise feature that forms an outward indentation in the modified vehicle body, as measured from the interior of the vehicle. This indentation effectively extends the lateral width of the vehicle interior at the site of the installation. The trim ring 400 is mounted opposite panel 100 as a trim piece designed to be coextensive with the boundary or contour of the indentation formed by the mounted panel 100, providing a finishing accompaniment to panel 100. The combination of exterior body panel 100 and interior trim ring 400 constitutes a customized retrofit to the original design of the vehicle.

Figure 5:
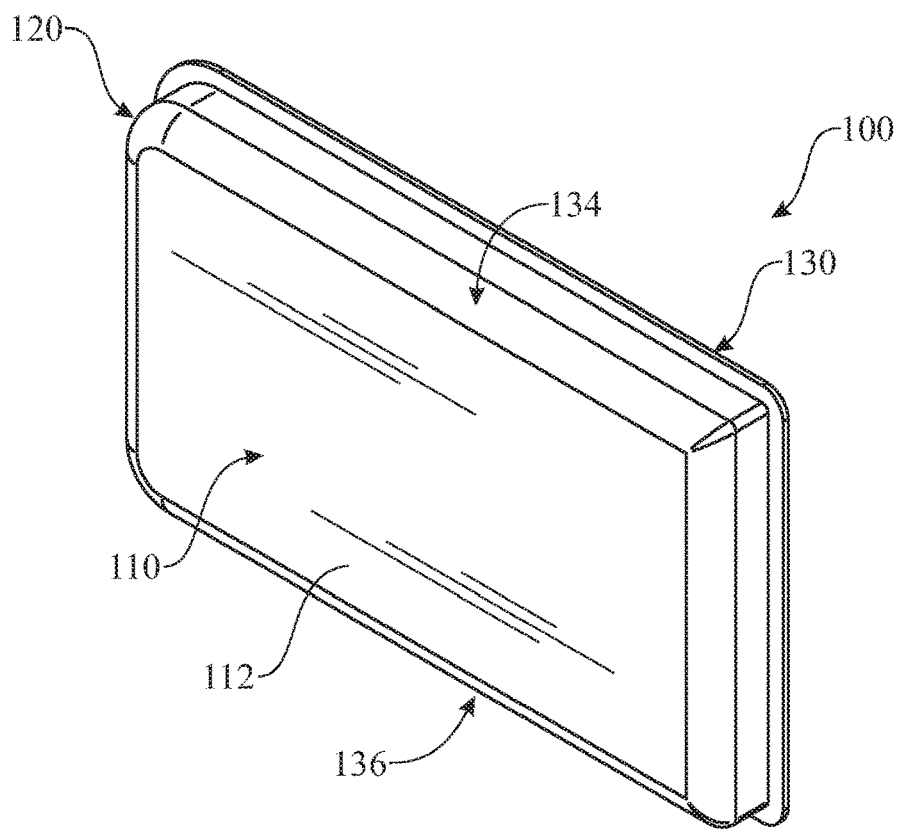
FIG. 5 presents a rear, exterior perspective view of the vehicle accessory panel of the first embodiment of the present invention.
Figure 6:
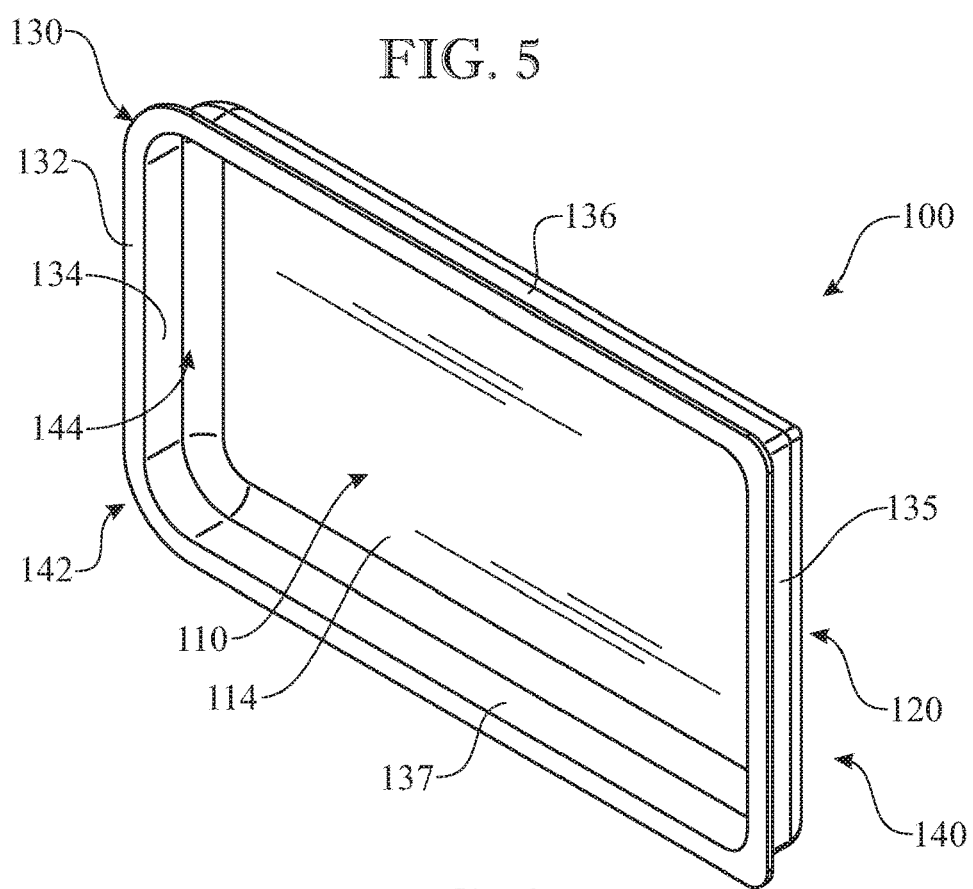
FIG. 6 presents a front, interior perspective view of the vehicle accessory panel of the first embodiment of the present invention.

Referring more particularly to FIGS. 5 and 6, panel 100 includes a base or wall member 110 having an exterior surface 112 and an interior surface 114. In one form, wall member 110 has a generally rectangular shape and a generally planar form. The panel 100 further includes a raised rim or edge 120 that extends from wall member 110. The raised rim 120 provides a perimeter or peripheral sidewall structure about wall member 110. The raised rim 120 may extend from wall member 110 in any of various suitable angles, such as orthogonal to provide a box-like perimeter or obtuse to provide a perimeter that slopes outward. The combination of wall member 110 with raised rim 120 forms a panel 100 having a depth profile, thereby defining a shallow depression, concave form or recessed feature in panel 100 that is defined and bounded by raised rim 120. Strictly on form, panel 100 has the general shape of a tray or tub.

The panel 100 includes, at the width-wise ends, a fore section or front end 140 and an opposite aft section or rear end 142. The panel 100 is installed on a vehicle body with the fore section 140 at a forward location (closest to the front of the vehicle) and the aft section 142 at a rear location (closest to the rear of the vehicle), The raised rim 120 is preferably configured as a peripheral sidewall structure. For example, the raised rim 120 includes a pair of opposing end walls 134, 135 and a pair of opposing sidewalls 136, 137 extending between the pair of end walls 134, 135. In a preferred implementation, the panel 100 tapers, in the length-wise direction, from the rear end 142 to the front end 140, creating a crown portion 144 defined at the terminus of the rear end 142 (i.e., the front end 140 is narrower or reduced in depth relative to the rear end 142). Additionally, an optional feature would involve a flaring of panel 100 in the lengthwise direction, such that panel 100 widens progressively in the direction from the front end 140 to the rear end 142. One exemplary panel 100 may include both features, the tapering (sloped profile) to provide a progressively reduced depth from rear to front, and the flaring (widening profile) to provide a progressively increased width from front to rear.

The panel 100 further includes, at the outer (upper) terminus of raised rim 120, a ledge or projecting flange 130 that extends outwardly. The flange 130 is a peripheral component that extends continuously and fully about the periphery of wall member 110. The flange 130 includes an outer surface 132 that serves as the mounting surface for panel 100. In a preferred form, panel 100 is a single piece, solid body construction. In particular, base member 110, raised rim 120, and flange 130 are not individual pieces assembled together but parts or features of an integrated, one-piece construction.

Referring now to FIG. 1, during the deployment and installation of panel 100, a vehicle body 200 is adapted at a target area, such as the rear quarter panel 202 of a conversion van, to be retrofit with accessory body panel 100, according to aspects of the present invention. Vehicles that are built with generic platforms typically have a layout and design that facilitate customization. In order to ease the implementation of selected options and upgrades in the generic platform, the vehicle is typically equipped with OEM (original equipment manufacturer) reference marks or contour lines that outline where certain features can be added. For example, in vans equipped with a windowless generic platform, such a reference mark can take the form of a stamped OEM window line to specify the contours of a window cut out where a window can be installed. In one form, the target area for modification is the rear quarter panel 202, which will include on its inside (interior) surface an OEM stamp line indicating the location of a window cut out.

In a preliminary installation stage, the vehicle body 200 is prepped by removing the section of rear quarter panel 202 that is outlined by the OEM stamp line specifying the window cut out. This procedure creates a hole or opening in the vehicle body 200 at rear quarter panel 202. After any relevant conditioning of the newly created opening in rear quarter panel 202, the accessory body panel 100 is mounted over the opening at flange 130, completely covering and spanning the opening. The flange 130 fits flush against the exterior surface of the vehicle body 200. The flange 130 mounts directly onto the exterior surface of the vehicle body in the area immediately adjacent the window cut-out opening, completely circumscribing the opening. In its mounted relationship, panel 100 is situated so that its lengthwise dimension generally follows the longitudinal axis of the vehicle, with front end 140 of panel 100 in a fore or forward position (closest to the front 204 of the vehicle) and rear end 142 in an aft or rearward position (closest to the back 206 of the vehicle). This positioning and orientation of panel 100 promotes positive aerodynamic behavior when panel 100 incorporates a tapering profile, in which the panel 100 slopes upwards from the fore section 140 to the aft section 142.

The mounting of panel 100 to vehicle body 200 (over the opening formed by the excised window cut-out) forms an outward indentation or recess from the perspective of the interior or occupant side of the vehicle body. This indentation reconfigures the interior of the vehicle body with an alcove or wall niche that expands the lateral width of the vehicle by an amount equal to the depth profile of the mounted panel 100. In a preferred implementation, this modification or retrofit of the vehicle body takes place at the rear quarter panel areas of both the driver side and passenger side. The result is a pair of opposing indentations or recesses that extend the lateral width of the vehicle body at both the driver and passenger sides, expanding the usable interior space to a degree commensurate with the interior volume of the mounted panel 100. In particular, an expanded cross-space is now available that incorporates the original crosswise or transverse dimensions, but which increases at both ends by the addition of the expansion spaces from the pair of accessory panel indentations. The new space afforded by the indentations can serve a variety of new uses. For example, a bed that otherwise would not fit into the vehicle (except perhaps in the same lengthwise alignment as the vehicle) can now be rotated so that the bed can fit lengthwise into the expanded transverse (lateral) cross-space. The ability of the bed to fit transversely, instead of longitudinally as formerly, saves significant space and creates opportunities to load the vehicle with additional items for storage. The indentation space can accommodate such items as shelves, televisions, lights, and window products.

Any conventional process can be used to cut the rear quarter panel 202 along the OEM window stamp line and to perform any further conditioning or treatment of the resultant opening. For example, after the opening is made, the exposed edge can be dressed or treated by an operation that deburs and primes the cutline. Additionally, any suitable conventional process can be used to prepare panel 100 for mounting. For example, an adhesive glue can be applied to the mounting surface 132 of flange 130, which serves to bond panel 100 to the vehicle body once flange 130 is mounted flush to the exterior surface of the vehicle body in position over the opening formed by the window cut-out. It is advisable to seal around the bonded interface between flange 130 and the exterior surface of the vehicle body to waterproof the area.

An important feature of accessory panel 100 is that its dimensions conform to the geometry of the designated window cut-out, so that panel 100 adequately spans and covers the window cut-out opening but does so without undue overlap of the vehicle body exterior. For this purpose, panel 100 is fabricated and otherwise manufactured to reflect the dimensions of the window cut-out. In one exemplary manufacturing process, a mold is provided, typically one that is larger than the dimensions to be produced. For example, the mold can be between 20 inches and 29 inches wide, between 47 inches and 65 inches long, and between 2 inches and 6 inches deep. According to conventional fabrication methods, a panel workpiece is produced using the mold. The workpiece may be a fiberglass composite, in one exemplary form. A quality control fixture is employed in order to ensure that the final production item, based on the workpiece, matches the required dimensions. For this purpose, the fixture is programmed or otherwise configured to incorporate OEM specifications that are indicative of reference dimensions concerning the vehicle. In particular, these built-in OEM specifications detail the dimensions of the window cut-out. The panel workpiece is loaded into the quality control fixture for processing. In particular, the panel workpiece is processed by operation of the quality control fixture in order to conform the processed panel workpiece to the OEM specifications and to thereby produce the panel 100. This reworking of the panel workpiece to produce the final version of the installation-ready accessory panel 100 can employ any suitable conventional methods known to those skilled in the art. In a post-production stage, the panel 100 can be treated with an ultra-violet resistant gel coating.

In one exemplary structural configuration, panel 100 is a fiberglass structure with a ¼" material thickness and approximate dimensions of 27.625"×49"×4.75". The panel 100 is a resin layup with integrated core mat, gel coated, and sanded to 320 grit finish. The glue flange is based on a 3-D (three-dimensional) scan of the actual van to ensure a very close match or fit. The installer will typically paint the panel 100 to match the color of the van. As mentioned, the install involves cutting out the sheet metal in the rear quarter panel, along the stamped OEM window line, and then gluing on the panel 100 using 3M 550FC adhesive. No mechanical fasteners are needed.

A variety of different dimensional geometries can be employed to fabricate panel 100, including, but not limited to, the following illustrative specifications:

| Vehicle | Width | Length | Depth |
| --- | --- | --- | --- |
| Sprinter 144 | 27.625" | 64" | 3.25"/5.25" |
| Sprinter 170 | 27.625" | 49" | 3.5"/4.75" |
| MBT1N Sprinter | 24.375" | 52.25" | 4.25" |
| Transit 148 | 28.25" | 64.5" | 3.25" |
| Transit 130 | 28.5" | 47.25" | 3" |
| Ram Promaster | 22.75" | 56" | 2.25" |
| Nissan NV | 20.5" | 54" | 3.25" |

Figure 2:
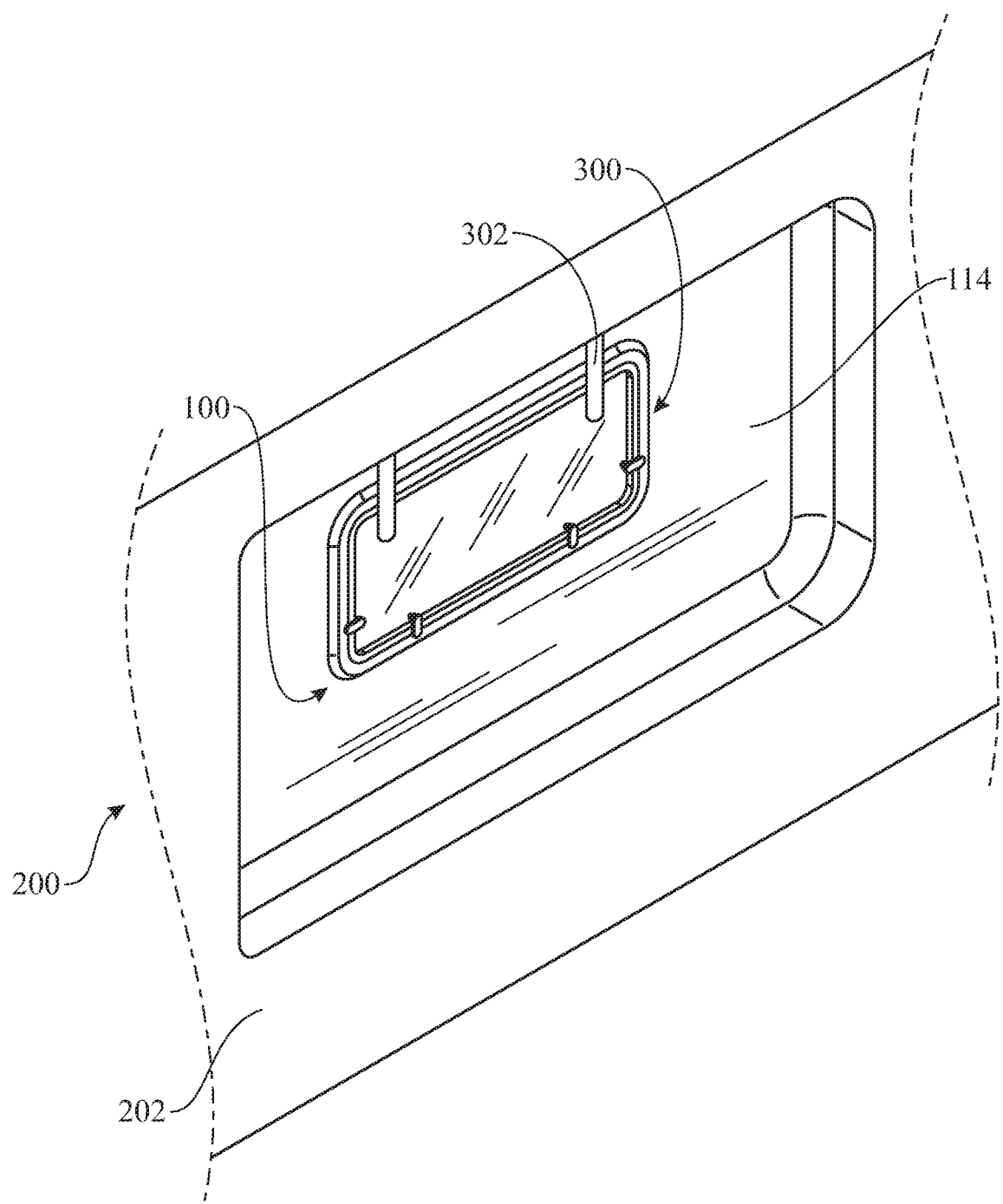
FIG. 2 presents a perspective interior-side view of a preferred implementation of the first embodiment of the vehicle accessory panel of the present invention, illustrating the installation of the panel in the body of a vehicle depicted in sectional view.
Figure 7:
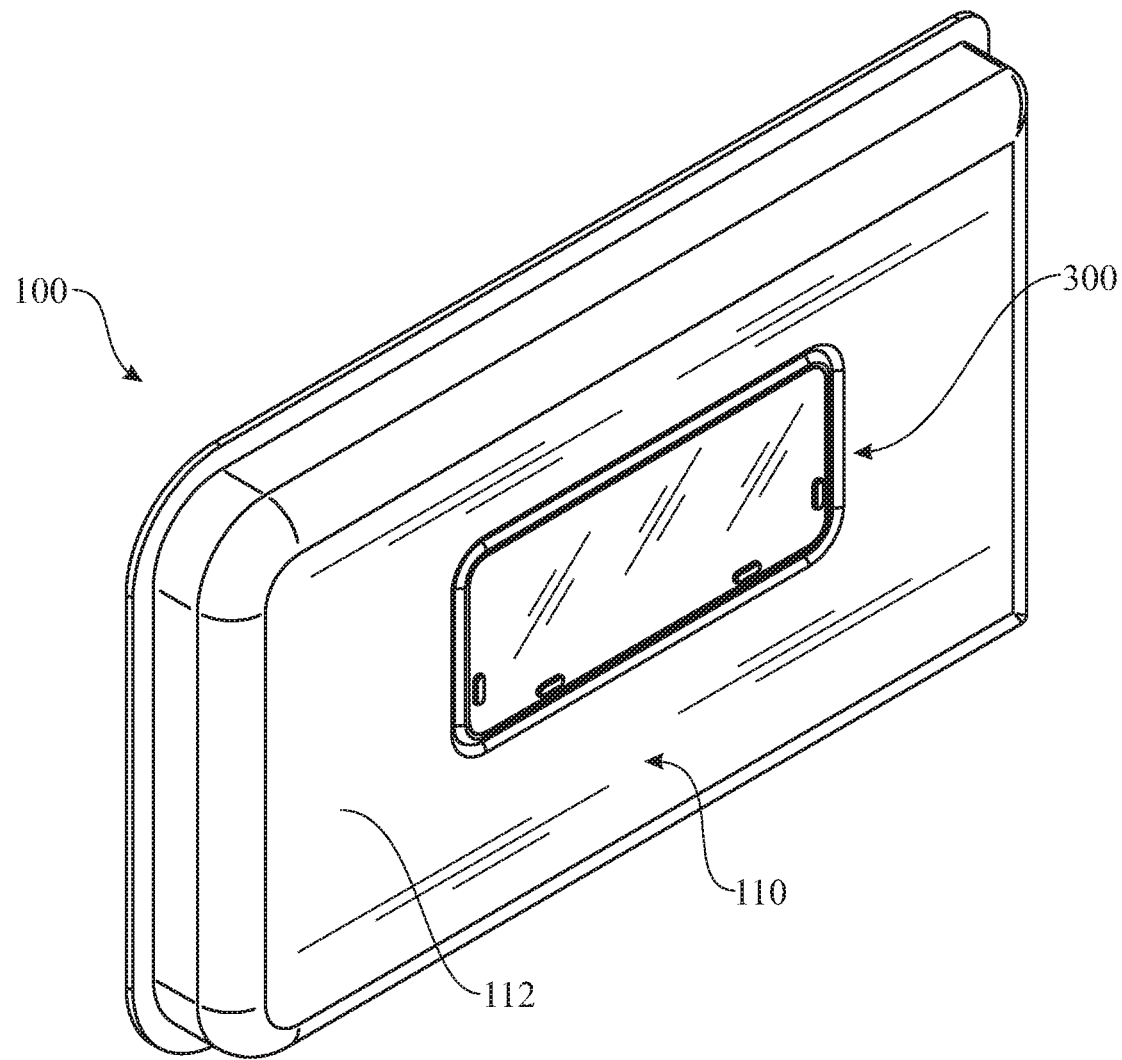
FIG. 7 presents a perspective exterior-side view of the trim ring installed to the body of the vehicle accessory panel of the present invention.

Referring now to FIGS. 2 and 7, one enhancement to panel 100 is the integration of a window 300 into the wall member 110. The window 300 would typically be installed prior to the deployment (mounting) of panel 100 onto the vehicle body. In order to accommodate the placement of window 300, wall member 110 of panel 100 would be appropriately machined to create an opening bordered by a sunken ledge or recessed edge relative to the exterior surface 112 of wall member 110. The window 300, then, could be integrated with panel 100 by seating window 300 within this window opening and onto the sunken ledge or recessed edge. The installed window 300 is preferably flush as much as feasibly possible with the exterior surface 112 of wall member 110. The window 300 may include a pair of pivot arms or rods 302 to prop the window open (e.g., swing outwardly).

Figure 3:
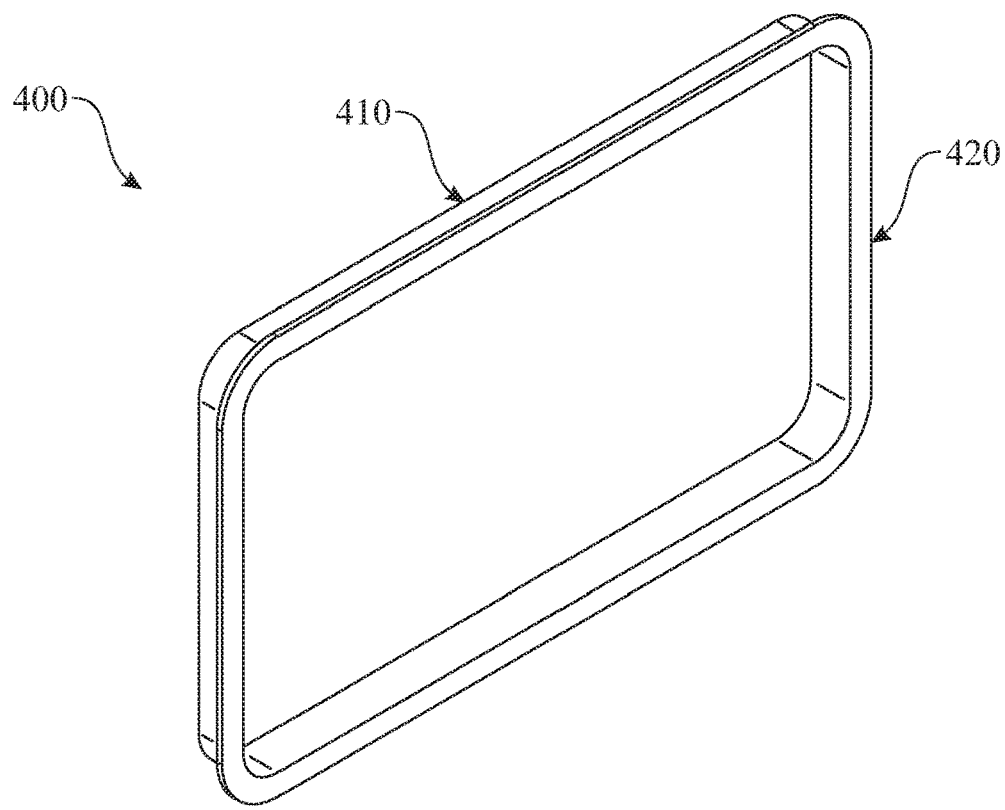
FIG. 3 presents a front perspective view of a trim ring showing a second embodiment of the vehicle accessory panel of the present invention.
Figure 4:
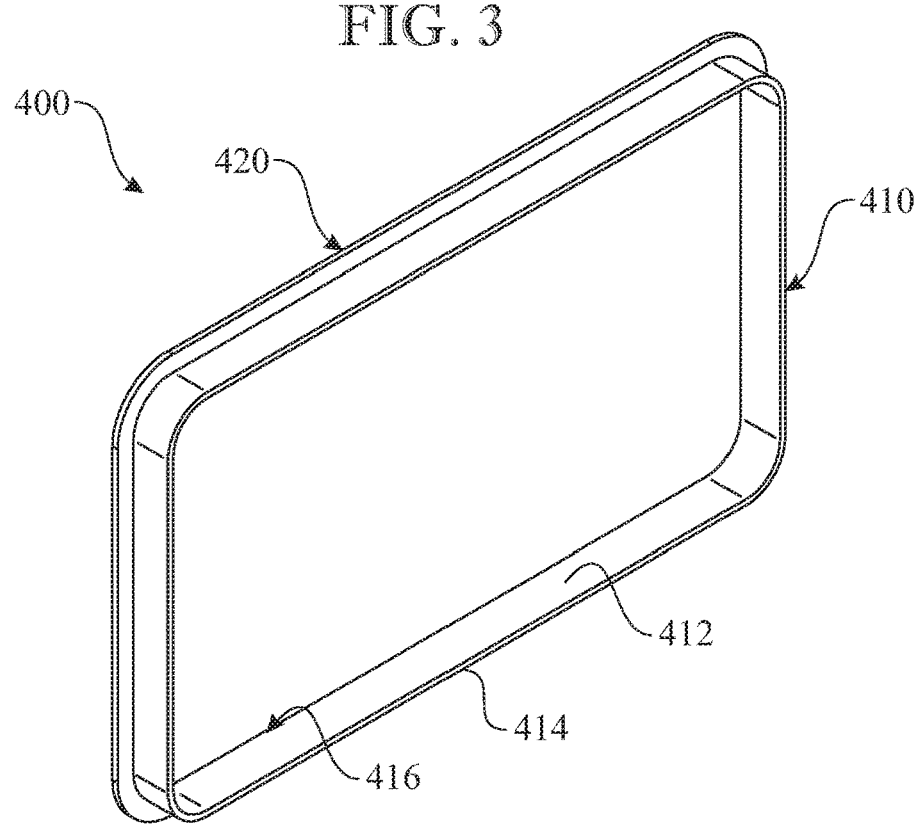
FIG. 4 presents a rear perspective view of the trim ring according to the second embodiment of the vehicle accessory panel of the present invention.

Referring now to FIGS. 3 and 4, the trim ring 400 includes a support member or insert portion 410 having a peripheral sidewall structure 412 extending between a bottom edge 414 and a top edge 416. A projecting flange 420 extends outwardly from insert portion 410 at the top edge 416. In one form, the trim ring 400 is a single-piece construction. The trim ring 400 is installed in the indentation or recess space formed by the panel 100 as mounted to the vehicle (FIGS. 1 and 2). In particular, the trim ring 400 is positioned over the mounted panel 100 from the interior side of the vehicle and seated within the recess or indentation formed by panel 100, resulting in an accessory combination in which trim ring 400 faces the mounted panel 100. In this deployment of trim ring 400, the insert portion 410 lies inside the raised rim (sidewall structure) 120 of panel 100 so that insert portion 410 abuts or faces the inside surface of raised rim 120. Furthermore, in the deployment of trim ring 400, the projection flange 420 of trim ring 400 faces and abuts an interior surface of the vehicle body, preferably in a flush relationship. The flange 420 traces out, and covers over, the incision line used to form the opening in the vehicle body over which panel 100 is mounted. In particular, the trim ring 400 is preferably a one-piece component that is shaped to fit an OEM-compliant vehicle panel opening. For this purpose, the trim ring 400 is fabricated to ensure that its dimensions conform, match, or otherwise fit the vehicle body opening that is contemplated. In this regard, the manufacture of trim ring 400 is coordinated with the design and measurement specifications of panel 100. The trim ring 400 can be attached to either the vehicle body or panel 100 using any suitable attachment or fastening means known to those skilled in the art. In a post-installation enhancement, the one-piece trim ring 400 can be covered with a first fabric, while the surface of panel 100 adjacent the trim ring 400 can be covered with a second fabric.

The trim ring 400 can be produced using any suitable process known to those skilled in the art. For example, the trim ring 400 can be made of fiberglass with a ¼" material thickness and be dimensionally smaller than the mount panel 100, for example, approximate dimensions may include a trim ring of about 25×47 inches. The insertion portion 410 of the trim 400 may be within the range of about 4 to 6 inches in size depending on the taper of the panel 100 and the contour of the van. Additionally, trim pieces may be finished with a gel coat. The trim ring 400 is designed to fit flush behind the mounted panel 100, and is pre-shaped to compatibly fit the contour of both the vehicle body opening and mounted panel 100.

As discussed herein, the present invention is directed to a vehicle accessory that retrofits a vehicle with a modification to extend the available interior space in the cross-wise or transverse dimension within the vehicle. An opening is formed in the vehicle body, such as the rear quarter panel of a van. An accessory body panel 100 having a recessed feature is mounted over the opening at the vehicle exterior, creating an interior-side indentation. Multiple indentations can be formed with a corresponding number of suitably sized accessory body panels paired with designated openings in the vehicle body. In one implementation, a pair of opposing indentations formed at the driver and passenger sides make it possible to fit a bed lengthwise in the transverse or lateral dimension of the vehicle, an option usually not possible in conventional, unmodified vans. A trim ring 400 may be mounted in the indentation from the interior side of the vehicle, so that the trim ring 400 is situated within and seated against the mounted accessory body panel 100. The opening, for example, may be defined by the OEM stamp line for a window cut-out. The combination of accessory body panel 100 and matching trim ring 400 forms a single package or unit.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A method for installing a vehicle body panel to a vehicle, the method comprising:
    forming an opening in a region of a body of the vehicle;
    mounting the vehicle body panel to the body of the vehicle over the opening, the vehicle body panel defining a recessed region; and
    mounting a trim ring to the body of the vehicle in the recessed region of the vehicle body panel.

2. The method of claim 1, wherein:
    an interior surface of the body of the vehicle includes at least one original equipment manufacturer reference feature, and
    forming the opening in the region of the body of the vehicle comprises removing the region of the body of the vehicle defined by the at least one original equipment.

3. The method of claim 1, wherein forming the opening in the region of the body of the vehicle comprises machining the region of the body of the vehicle to define the opening.

4. The method of claim 1, wherein forming the opening in the region of the body of the vehicle comprises forming the opening in a rear quarter panel of the vehicle.

5. The method of claim 1, wherein mounting the vehicle body panel to the body of the vehicle comprises adhering the vehicle body panel to the body of the vehicle.

6. The method of claim 5, wherein:
    the vehicle body panel defines a flange, and
    adhering the vehicle body panel to the body of the vehicle comprises applying adhesive to the flange of the vehicle body panel.

7. The method of claim 1, wherein mounting the vehicle body panel to the body of the vehicle comprises mounting the vehicle body panel to an exterior surface of the body of the vehicle.

8. The method of claim 7, wherein mounting the trim ring to the body of the vehicle in the recessed region comprises mounting the trim ring from an interior of the vehicle.

9. The method of claim 1, further comprising:
    forming a second opening in a second region of the body of the vehicle, the second region being opposite the region of the body of the vehicle;
    mounting a second vehicle body panel to the body of the vehicle over the second opening, the second vehicle body panel defining another recessed region; and
    mounting a second trim ring to the body of the vehicle in the other recessed region of the second vehicle body panel.

10. The method of claim 9, wherein:
    the region of the body of the vehicle is the driver side rear quarter panel of the vehicle, and
    the second region of the body of the vehicle is the passenger side rear quarter panel of the vehicle.

11. The method of claim 9, wherein an interior width of the vehicle between the vehicle body panel and the second vehicle body panel can accommodate a bed in a lengthwise direction.

12. The method of claim 1, wherein:
    the body of the vehicle has an initial interior width at the region before forming the opening,
    the body of the vehicle has a second interior width at the region following mounting of the vehicle body panel to the body of the vehicle, and
    the second interior width is greater than the initial interior width.

13. The method of claim 12, wherein the vehicle defines a longitudinal direction extending from the front of the vehicle to the back of the vehicle, and wherein the interior width of the vehicle is transverse to the longitudinal direction.

14. The method of claim 1, wherein the trim ring defines a peripheral sidewall and a projecting flange extending radially from the peripheral sidewall.

15. The method of claim 14, wherein mounting the trim ring to the body of the vehicle causes the projecting flange to cover an incision line formed by the opening in the region of the body of the vehicle.

16. The method of claim 1, wherein the recessed region of the vehicle body panel flares such that the vehicle body panel progressively widens from a front end of the vehicle body panel to a rear end of the vehicle body panel.

17. The method of claim 1, wherein the vehicle is a full-sized passenger van or a cargo van.

18. The method of claim 1, wherein the vehicle body panel comprises a window.

19. The method of claim 1, further comprising molding the vehicle body panel as one-piece.

20. The method of claim 1, wherein the vehicle body panel comprises fiberglass.

* * * * *